UNITED STATES PATENT OFFICE.

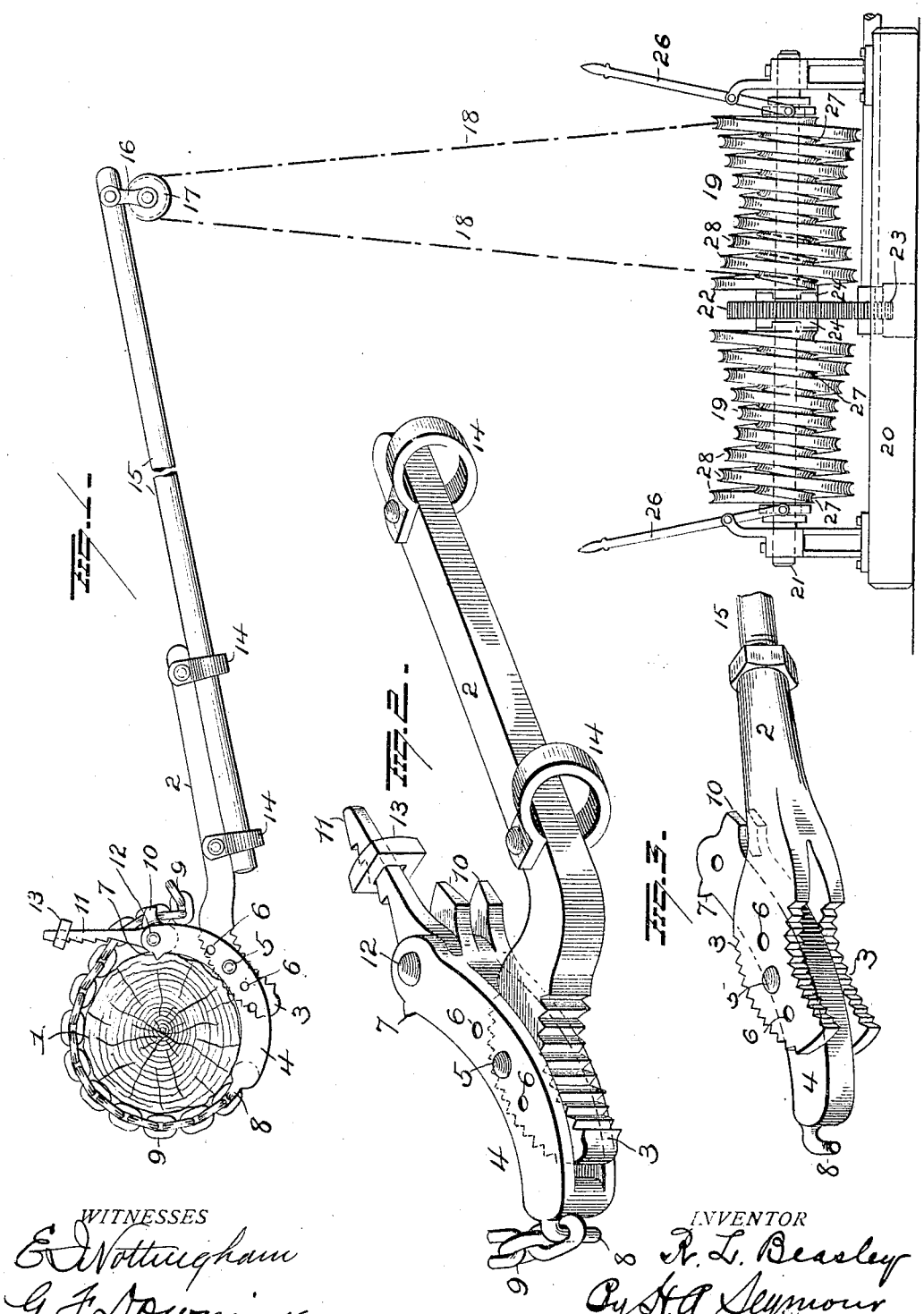

RALLEIGH L. BEASLEY, OF GORDON, ALABAMA.

STUMP-PULLING APPARATUS.

No. 852,411.   Specification of Letters Patent.   Patented May 7, 1907.

Application filed May 2, 1906. Serial No. 314,853.

*To all whom it may concern:*

Be it known that I, RALLEIGH L. BEASLEY, a resident of Gordon, in the county of Houston and State of Alabama, have invented certain new and useful Improvements in Stump-Pulling Apparatus; and I do hereby declare the following to be a full, clear, and exact description of the invention, such as will enable others skilled in the art to which it appertains to make and use the same.

My invention relates to improvements in stump pulling apparatus, and the invention consists in certain novel features of construction and combinations and arrangements of parts as will be more fully hereinafter described and pointed out in the claims.

In the accompanying drawings, Figure 1 is a plan view illustrating my improvements in operation. Fig. 2 is a perspective view of the stump engaging device. Figs. 3 and 4 are views of details of construction, and Fig. 5 is a view of a modification.

1 represents a stump to be drawn and 2 is my improved lever. The lever 2 is made with a curved jaw 3 at one end and the jaw is toothed at both sides, as shown, and may be used in the position shown, or may be reversed to bring the concave of the jaw against the stump. The jaw is pivoted in an elongated slot on a curved dog 4, by means of a pin 5 and the jaw is provided with a series of pin receiving openings 6 to receive the pin in any of them according to the leverage desired. The dog 4 has a sharp prong 7 at one end to engage the stump, and is made with a hook 8 at its other end to receive one end of a chain 9 to be passed around the stump and secured to the other end of the dog. Two means are shown to secure the chain to the dog so that one may be employed in the event of injury to the other. One means for securing the chain is to provide the dog with an integral fork 10 to hold the links against movement. The other means comprises a toothed bar 11 pivotally secured to the dog by a bolt 12. This bar is adapted to receive any link of the chain, and is provided with a nut 13 to be placed on the bar back of the chain and hold the chain against escape by reason of the nut catching in the teeth of the bar.

Instead of having a slotted dog to receive the jaw of the lever, I may bifurcate the lever to receive the dog therein, as shown in Fig. 3.

The lever is provided with loops 14 at its side to receive a long bar or arm 15, or it may have a socket to receive the bar or arm. The outer end of this bar or arm has a bracket 16 secured thereto, and a pulley 17 is mounted in the bracket, and a cable 18 operated by my improved drum 19 is passed around the pulley 17 to swing the lever and pull the stump as will be hereinafter explained.

20 represents a frame supporting a horizontal shaft 21, on which a gear 22 is secured and driven by a pinion 23 connected with any engine or any source of power. On the shaft 21 at both sides of the gear 22 my improved drums 19 are loosely mounted on shaft 21 and adapted to be connected with the gear 22 by means of clutches 24 whereby the drums and gear will be caused to turn together, and these drums are moved by levers 26 into or out of locked engagement with the gear.

Both drums are constructed alike and the hereinafter description of one will apply alike to both.

The drum is in the nature of a duplex or differential drum, having two continuous spirals 27 and 28 for the cable. The inner spiral 27 is of substantially the same diameter throughout and the outer spiral 28 while of greater diameter throughout than the spiral 27 is of least diameter at its center and increases in diameter to its ends.

The cable 18 is secured at its ends to the ends of the drum and we will assume is wound on the smaller spiral 27. When the drum is turned in one direction it will wind on the larger spiral as it is fed from the smaller and as it will be taken up faster than it is fed from the drum, the looped portion of the cable will be drawn up to operate the stump engaging means above described to first twist the stump and then pull it out of the ground. By turning the drum in the opposite direction, the cable will be fed off the larger spiral and onto the smaller and hence let out the cable ready for the next operation. It will also be seen that as the outer spiral diminishes to the center it will have its greatest power or leverage at this point which will be when pull is desired on the stump to draw it out of the ground.

By having two drums, one may be operated to draw a stump while the other is being turned to feed out its cable, and thus save considerable time.

A great many slight changes might be made in the general form and arrangement of the parts described without departing from my invention and hence I would have it understood that I do not restrict myself to the precise details set forth but consider myself at liberty to make such slight changes and alterations as fairly fall within the spirit and scope of my invention.

Having fully described my invention what I claim as new and desire to secure by Letters-Patent, is:—

1. A drum for stump pullers and the like, consisting of two spirals one of greater diameter than the other and both adapted to wind cable thereon or therefrom.

2. A drum for stump pullers and the like, consisting of two spirals, one larger than the other and of smallest diameter at its center and increasing in diameter to its ends.

3. A drum for stump pullers and the like, consisting of two spiral cables receiving grooved portions, one larger than the other, a cable secured at its ends to the drum and adapted to wind from one spiral onto the other to shorten or lengthen the loop of the cable.

4. In a stump pulling apparatus, the combination with a shaft, a gear fixed thereto, and means for turning the shaft, of differential or duplex drums loose on the shaft at opposite sides of the gear, clutches to lock either or both drums to the gear, levers to move the drums into or out of clutched engagement with the gear, and both of said drums constructed to operate stump pulling devices.

In testimony whereof, I have signed this specification in the presence of two subscribing witnesses.

RALLEIGH L. BEASLEY.

Witnesses:
S. W. FOSTER,
A. W. BRIGHT.